United States Patent [19]

Uemura et al.

[11] Patent Number: 5,726,840
[45] Date of Patent: Mar. 10, 1998

[54] MAGNETIC HEAD APPARATUS HAVING MULTIPLE RECESSED MAGNETIC METAL FILMS

[75] Inventors: Seiko Uemura, Yamaga; Hiroshi Okayama; Seishi Tomari, both of Kumamoto, all of Japan

[73] Assignee: Matsushita Electric Industrial Co., Ltd., Osaka, Japan

[21] Appl. No.: 691,658

[22] Filed: Aug. 2, 1996

Related U.S. Application Data

[62] Division of Ser. No. 330,237, Oct. 27, 1994, which is a continuation of Ser. No. 983,027, Nov. 30, 1992, abandoned.

[30] Foreign Application Priority Data

Dec. 2, 1991 [JP] Japan .................. 3-317697

[51] Int. Cl.$^6$ .................. G11B 5/187
[52] U.S. Cl. .................. 360/122
[58] Field of Search .................. 360/103, 122

[56] References Cited

U.S. PATENT DOCUMENTS

| | | | |
|---|---|---|---|
| 5,083,365 | 1/1992 | Matsumoto | 360/122 |
| 5,485,335 | 1/1996 | West | 360/122 |

FOREIGN PATENT DOCUMENTS

| | | | |
|---|---|---|---|
| 60-219613 | 11/1985 | Japan . | |
| 61-237216 | 10/1986 | Japan . | |
| 1-37703 | 2/1989 | Japan | 360/103 |
| 1138607 | 5/1989 | Japan . | |

*Primary Examiner*—Stuart S. Levy
*Assistant Examiner*—David D. Davis
*Attorney, Agent, or Firm*—Lowe, Price, LeBlanc & Becker

[57] ABSTRACT

A slider being made of ferrite and a core formed with a magnetic metal film on its gap confronting surface are connected together by means of bonding glass so as to sandwich a non-magnetic film therebetween as a magnetic gap. The magnetic metal film is made of a magnetic metal material such as Fe—Ni, Fe—Al—Si and the like, and is constructed through the thin-film fabrication technology such as sputtering. A recessed portion is provided on the magnetic metal film in such a manner that the recessed portion is retracted from a medium confronting surface of the magnetic head by a depth t. Thus, no color change is caused on the magnetic metal material and, therefore, no deterioration in various characteristics of the magnetic head is expected.

8 Claims, 11 Drawing Sheets

MAGNETIC HEAD APPARATUS HAVING MULTIPLE RECESSED MAGNETIC METAL FILMS

This application is a division of now allowed application Ser. No. 08/330,237 filed Oct. 27, 1994, which is a continuation of application Ser. No. 07/983,027, filed Nov. 30, 1992, now abandoned.

BACKGROUND OF THE INVENTION

1. Field of the Invention

The present invention relates to a magnetic head which is chiefly used for magnetically recording, reproducing, or erasing information in a magnetic disk device and the like.

2. Description of the Related Art

A typical magnetic head apparatus is perspectively shown in FIG. 14. In FIG. 14, a slider 1 is made of a magnetic oxide material such as ferrite. This slider 1 has a pair of floating rails 2, 3 elongated in parallel with each other at opposite both ends of the slider 1. The flat surfaces of these floating rails 2, 3 are confronted to a medium surface; e.g. a disk surface, so that the slider 1 can slide on the medium surface smoothly. Though illustrated up side down in FIG. 14, this slider 1 is to be placed on the medium so that these floating rails 2, 3 are directly brought into contact with the medium surface.

The slider 1 further includes a center rail 4 having a predetermined track width TW, provided between the floating rails 2 and 3 in parallel with them. At one end of the slider 1, a C-shaped core 5 made of magnetic oxide material such as ferrite is provided in confronting relationship with the corresponding side edge of the center rail 4.

There is further provided a magnetic gap 9 through which the core 5 is faced to the edge surface of the center rail 4. And also, a bonding glass 6 is provided to securely connect the core 5 to the slider 1. A winding 7 is wound around a centrally extending vertical column portion of the core 5.

Details of the joint structure between the slider 1 and the core 5 is enlargedly shown in FIG. 15. As is apparent from FIG. 15, a magnetic metal film 8 is constructed on a surface 5a of the core that is confronted to the magnetic gap 9. This magnetic metal film 8 is made of a magnetic metal material such as Fe—Ni or Fe—Al—Si and the like, and is constructed on the confronting surface 5a through an application of the thin film fabrication technology such as sputtering. The magnetic gap 9 is a non-magnetic film made of a non-magnetic material such as $SiO_2$. This non-magnetic film 9 is constructed on the edge surface of the slider 1 through an application of the thin film fabrication technology such as sputtering.

An operation of the magnetic head apparatus constituted as described above is explained hereinafter with reference to FIGS. 18 and 17.

In FIGS. 18 and 17, reference numerals 10, 11, and 12 denote a magnetic head shown in FIG. 14, a magnetic disk, and air stream, respectively. When the magnetic disk 11 is not turned, the magnetic head 10 is laid on the magnetic disk 11 stationarily in such a manner that the floating rails 2, 3 and the center rail 4 are directly brought into contact with the upper surface of the magnetic disk 11, as shown in FIG. 18. To the contrary, once the magnetic disk 11 causes its turning movement, the magnetic head 10 comes to slide on the magnetic disk 11 with a frictional engagement. If the rotational speed of the magnetic disk 11 exceeds a predetermined value, the air stream 12 caused in relation to the turning surface of the magnetic disk 11 becomes so strong that the magnetic head 10 takes off the magnetic disk 11 and keeps flying against the magnetic disk 11 by maintaining a certain gap.

However, such a conventional structure has the following problem. As the magnetic head 10 is directly contacted with the upper surface of the magnetic disk 11 in the case where the magnetic disk 11 is not turned, the magnetic metal film 8 is brought into contact with the magnetic disk 11 at its confronting edge 8a. As enlargedly shown in FIG. 15(a), the surface of magnetic disk 11 is usually coated by lubricant 100 and may be wetted by moisture 101. If the magnetic metal film 8 made of active metal is exposed in such a severe condition, the magnetic metal film 8 may cause chemical reaction to generate color change which results in deterioration in various characteristics of the magnetic head.

SUMMARY OF THE INVENTION

Accordingly, the present invention has a purpose, in view of above-described problems or disadvantages, to provide a magnetic head that does not cause any color change through the chemical reaction by the magnetic metal film and the lubricant or moisture, thereby realizing a magnetic head apparatus which is capable of maintaining its characteristics nicely against lubricant and moisture.

In order to accomplish above purposes, a first aspect of the present invention provides a magnetic head apparatus comprising: a magnetic material constituting a magnetic circuit in a magnetic head; a magnetic gap being provided at a part of said magnetic circuit; a magnetic metal material constituting at least a part of said magnetic material constituting the magnetic circuit; a medium confronting surface being made on one side of said magnetic head so as to be brought into slidable contact with a surface of a medium; said magnetic metal material having a surface confronting at least partially to the surface of said medium; and said surface of the magnetic metal material being recessed away from said medium confronting surface.

In a preferable mode of the first aspect of the present invention, the recessed surface of the magnetic metal material is retracted from the medium confronting surface by 2 nm to 20 nm.

A second aspect of the present invention provides a magnetic head apparatus comprising: a pair of cores constituting a part of a magnetic head; a winding groove provided at least on either of said cores; a magnetic gap provided between said pair of cores so as to be sandwiched therebetween; a magnetic metal film being formed on a surface of at least either of said cores, said surface facing toward said magnetic gap; a medium confronting surface being made on one side of said magnetic head so as to be brought into slidable contact with a surface of a medium; said magnetic metal film having a surface confronting at least partially to the surface of said medium; and said surface of the magnetic metal film being recessed away from said medium confronting surface.

In a preferable mode of the second aspect of the present invention, said recessed surface of the magnetic metal film is retracted from the medium confronting surface by 2 nm to 20 nm. And, said core is made of ferrite and said magnetic metal film is made of at least one material belonging to a group consisting of Fe—Ni series alloy, Fe—Al—Si series alloy, Fe series amorphous, and Co series amorphous.

Furthermore, a third aspect of the present invention provides a magnetic head apparatus comprising: a substrate constituting a pair of core assemblies for a magnetic head;

a laminated core provided on said substrate, said laminated core being constituted by alternately laminating a magnetic metal film and an insulation film; a winding groove provided on at least either of said core assemblies; a magnetic gap provided between said pair of core assemblies so as to be sandwiched therebetween; a medium confronting surface being made on one side of said substrate so as to be brought into slidable contact with a surface of a medium; said magnetic metal film having a surface confronting at least partially to the surface of said medium; and said surface of the magnetic metal film being recessed away from said medium confronting surface.

In a preferable mode of the third aspect of the present invention, said recessed surface of the magnetic metal film is retracted from the medium confronting surface by 2 nm to 20 nm. And, said insulation film is made of $SiO_2$ and said magnetic metal film is made of at least one material belonging to a group consisting of Fe—Ni series alloy, Fe—Al—Si series alloy, Fe series amorphous, and Co series amorphous.

Furthermore, a fourth aspect of the present invention provides a magnetic head apparatus comprising: a substrate constituting a part of a magnetic head; a pair of magnetic layers laminated through a magnetic gap on the substrate; a coil layer provided between said pair of magnetic layers; a medium confronting surface being made on one side of said substrate so as to be brought into slidable contact with a surface of a medium; said magnetic layer having a surface confronting at least partially to the surface of said medium; and said surface of the magnetic layer being recessed away from said medium confronting surface.

In a preferable mode of the fourth aspect of the present invention, said recessed surface of the magnetic layer is retracted from the medium confronting surface by 2 nm to 20 nm. And, at least either of said magnetic layers is made of at least one material belonging to a group consisting of Fe—Ni series alloy, Fe—Al—Si series alloy, Fe series amorphous, and Co series amorphous.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, with reference to accompanying drawings, preferred embodiments of the present invention are explained in detail. As the fundamental function and operation of the magnetic head and the magnetic disk in each embodiment are the same as those of above-described typical magnetic head apparatus, it should be noted that the above-described explanation regarding such a fundamental affair is directly applied to the later described explanation of each embodiment of the present invention.

FIRST EMBODIMENT

Figure 1:
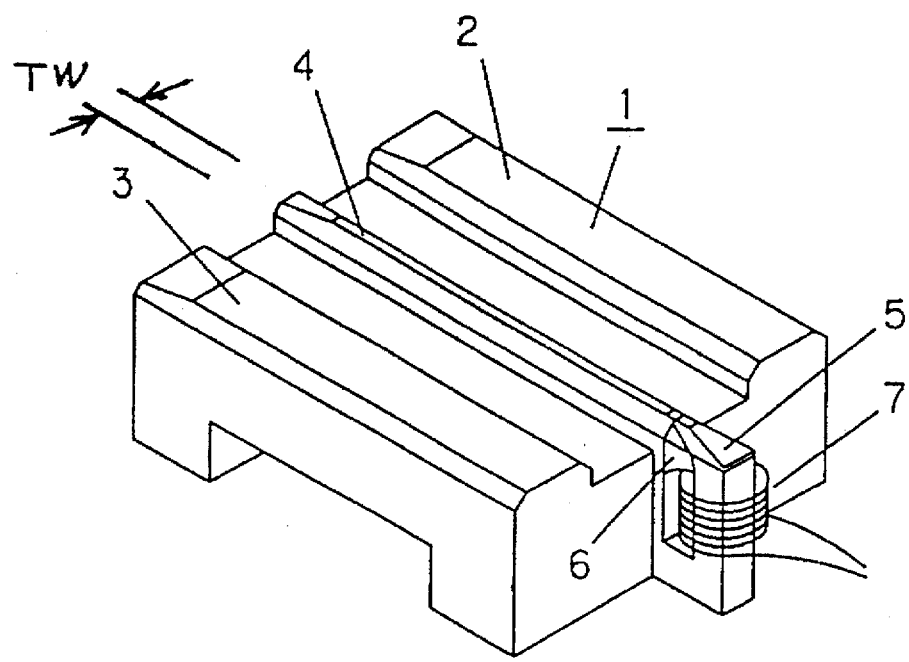
FIG. 1 is a perspective view showing a magnetic head apparatus in accordance with a first embodiment of the present invention.
Figure 14:
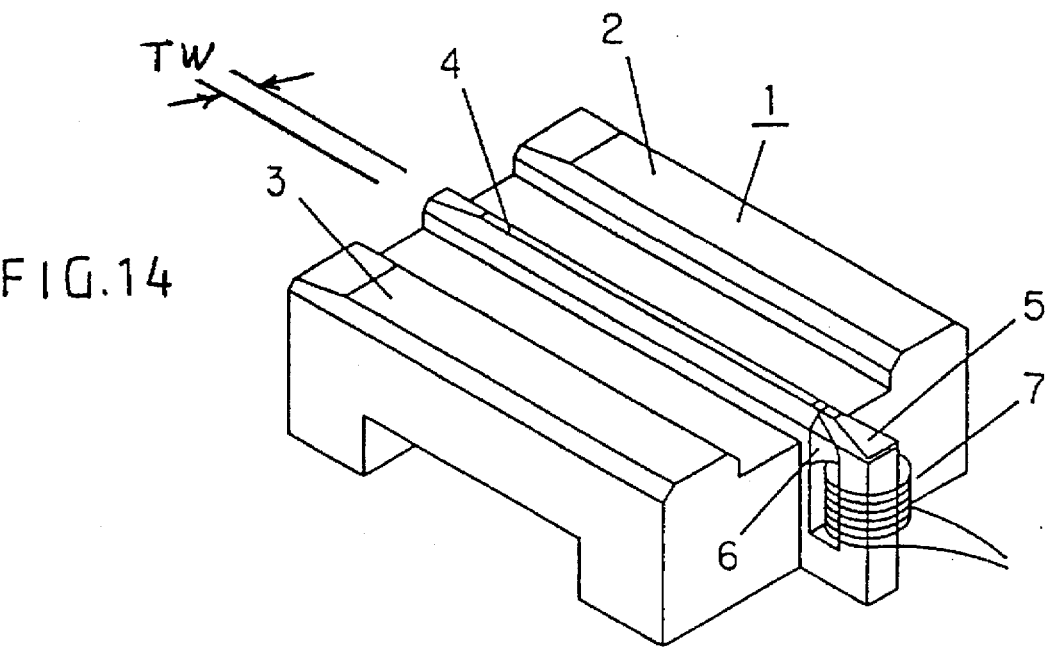
FIG. 14 is a perspective view showing a typical magnetic head apparatus.
Figure 15:
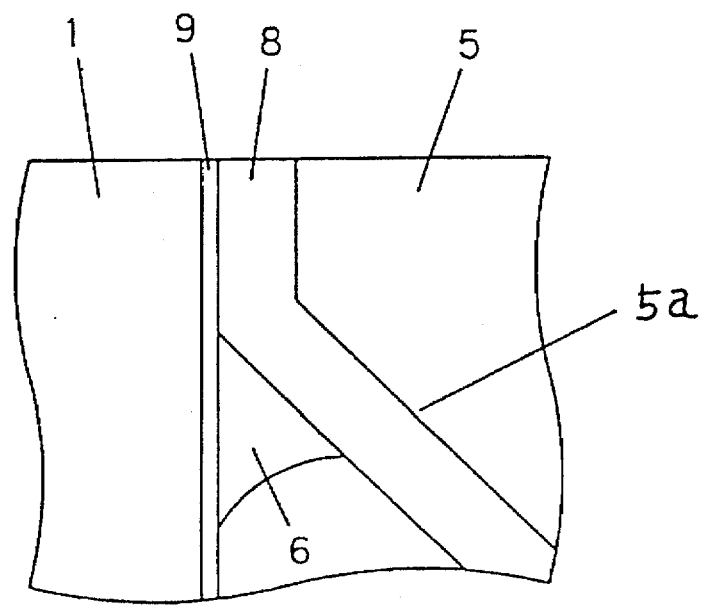
FIG. 15 is a fragmentally enlarged side view showing the typical magnetic head apparatus.
Figure 15A:
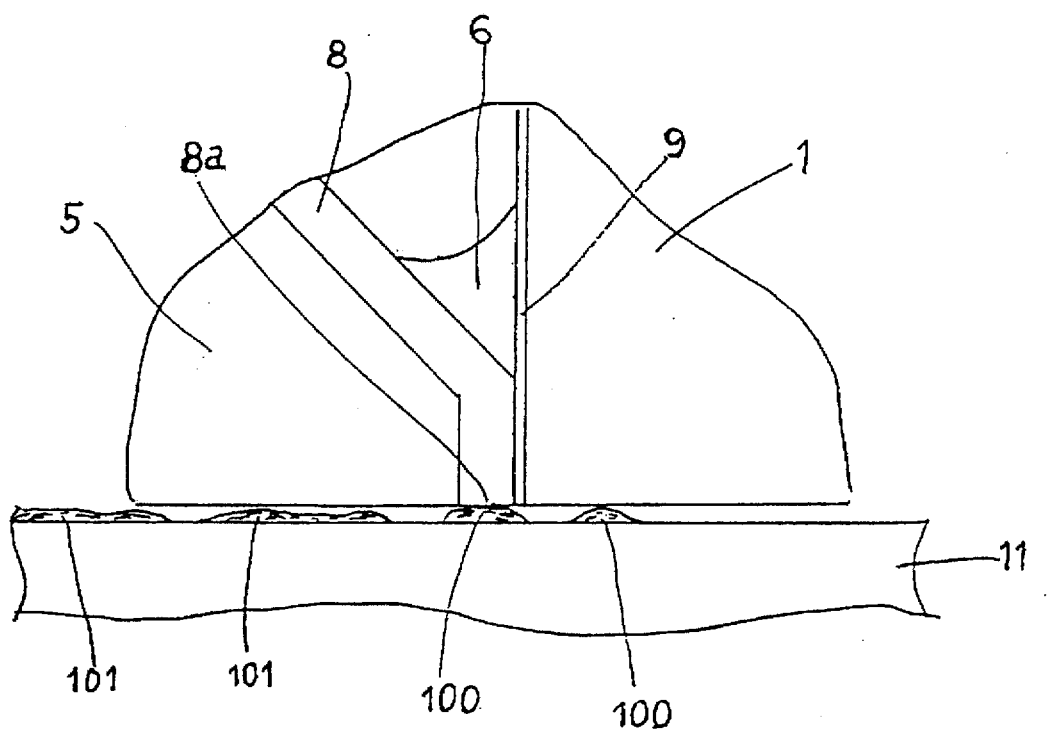
FIG. 15(a) is also a fragmentally enlarged side view showing the typical magnetic head apparatus.
Figure 16:
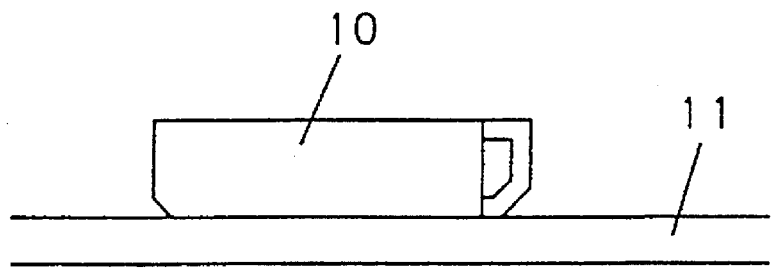
FIG. 16 is a side view illustrating a stationary condition of the typical magnetic head laid on the magnetic disk; and, FIG. 17 is a side view illustrating a dynamic condition of the typical magnetic head flying above the magnetic disk.
Figure 17:
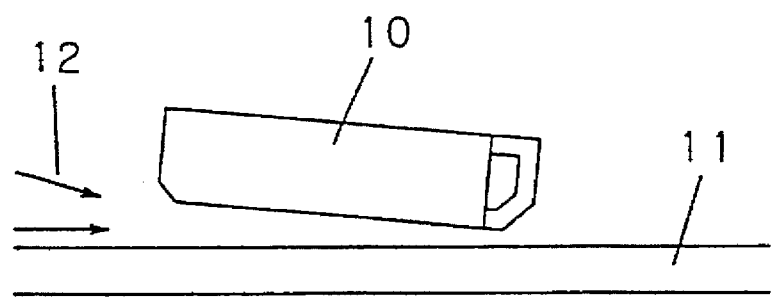

A magnetic head apparatus in accordance with a first embodiment of the present invention is perspectively shown in FIG. 1. The magnetic head apparatus shown in FIG. 1 is illustrated as an example obtained by simply applying the present invention to the typical magnetic head apparatus described with reference to FIG. 14.

In FIG. 1, a slider 1 is made of magnetic oxide material such as ferrite. This slider 1 has a pair of floating rails 2, 3 elongated in parallel with each other at opposite both ends of the slider 1. The flat surfaces of these floating rails 2, 3 are confronted to a media surface; e.g. a disk surface. Though illustrated up side down in FIG. 1, this slider 1 is to be placed on the medium so that these floating rails 2, 3 are directly brought into contact with the medium surface.

The slider 1 further includes a center rail 4 having a predetermined track width TW, provided between the floating rails 2 and 3 in parallel with them. At one end of the slider 1, a C-shaped core 5 made of magnetic oxide material such as ferrite is provided in confronting relationship with the corresponding side edge of the center rail 4. There is provided a magnetic gap 9 through which the core 5 is faced to the edge surface of the center rail 4. And also, a bonding glass 6 is provided to secure the core 5 to the slider 1.

A winding 7 is wound around a centrally extending vertical column portion of the core 5.

Figure 2:
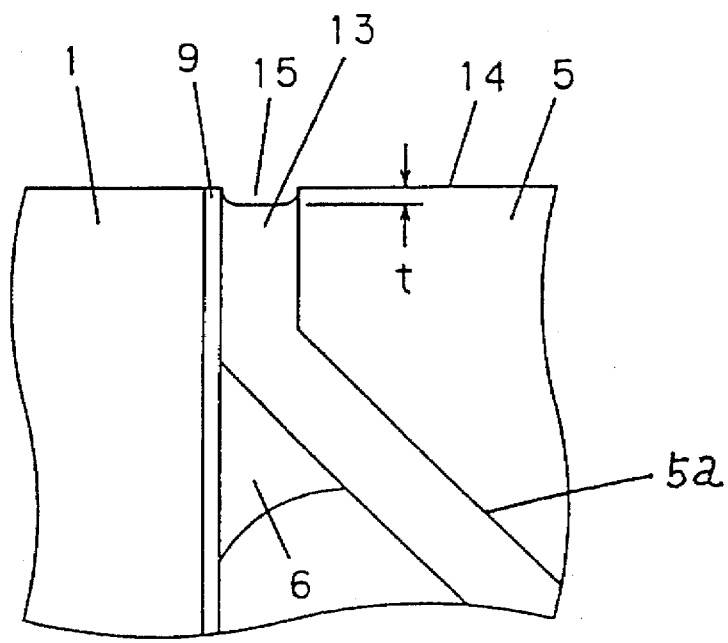
FIG. 2 is a fragmentally enlarged side view showing the magnetic head apparatus in accordance with the first embodiment of the present invention.
Figure 2A:
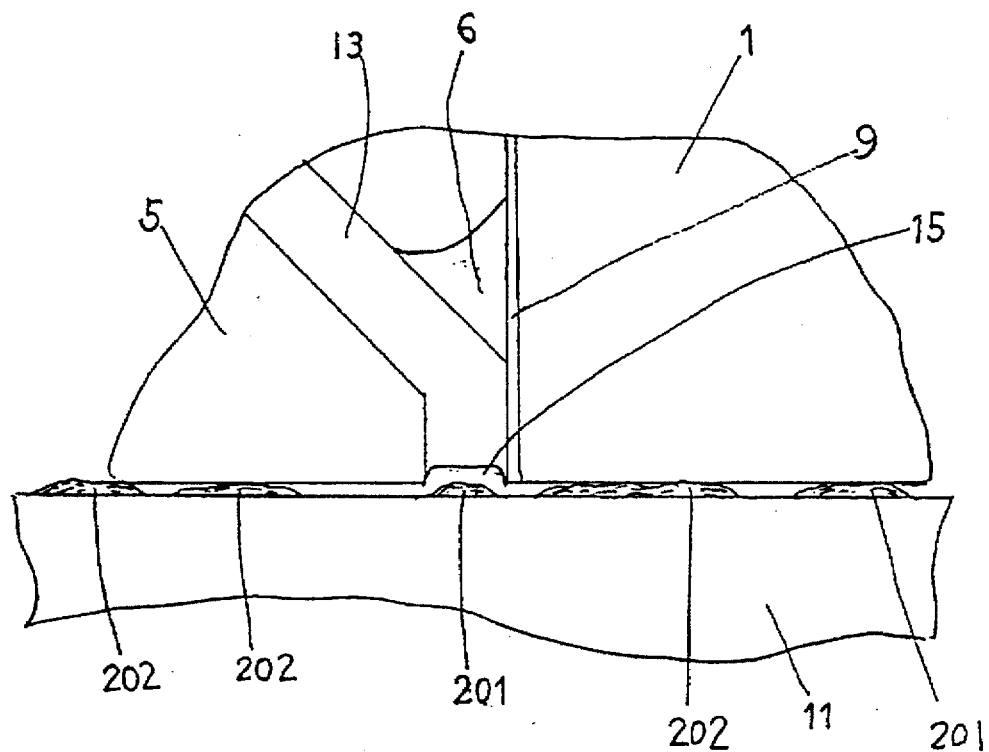
FIG. 2(a) is also a fragmentally enlarged side view showing the magnetic head apparatus in accordance with the first embodiment of the present invention.

Details of the connecting structure between the slider 1 and the core 5 is enlargedly shown in FIG. 2. As clearly shown in FIG. 2, a magnetic gap 9 is provided on an edge surface of the slider 1. The magnetic gap 9 is a non-magnetic film made of a non-magnetic material such as $SiO_2$. An application of the thin film fabrication technology such as sputtering enables this non-magnetic film 9 to grow uniformly on the edge surface of the slider 1.

Also shown in FIG. 2 is a magnetic metal film 13 formed on a core surface 5a that is confronted to the magnetic gap 9. This magnetic metal film 13 is made of a magnetic metal material such as Fe—Ni series alloy, Fe—Al—Si series alloy, Fe series amorphous, or Co series amorphous and the like. And, this magnetic metal film 13 is constructed on the confronting core surface 5a by an application of the thin film fabrication technology such as sputtering.

As to the characteristic feature of the present invention, the magnetic metal film 13 is formed with a recessed portion 15 that is retracted from a medium confronting surface 14 to have a depth t. This recess depth t is set to 10 nm in this embodiment.

With this arrangement, the magnetic metal film 13 is effectively prevented from being directly brought into contact with a magnetic disk 11 when the magnetic disk 11 is in a stationary condition without being turned. In more detail, as there is provided the recessed portion 15 that is retracted from the medium confronting surface 14 by the depth t, the magnetic metal film 13 is kept away from lubricant 201 coated on the surface of the magnetic disk 11 or moisture 202 settled on the surface of the magnetic disk 11 so as not to cause chemical reaction irrespective of its chemically active nature. Thus, it becomes possible to prevent the magnetic metal film 13 from causing color change and so on. Therefore, various characteristics of the magnetic head are maintain properly without being adversely deteriorated.

Next, a relationship between the depth t of the recessed portion 15 and a relative output of the magnetic head is explained. In this embodiment, the measurement of the relationship between the depth t of the recessed portion 15 and the relative output of the magnetic head is carried out in two cases of lengths 0.5 um and 0.3 um with respect to the magnetic gap 9. Furthermore, a flying height of the magnetic head is set to 100 nm. And, the size of the magnetic disk is 3.5 inches. Moreover, Co—Ni—Cr is used as a material for the magnetic film. The result of this measurement is shown in FIG. 3.

Figure 3:
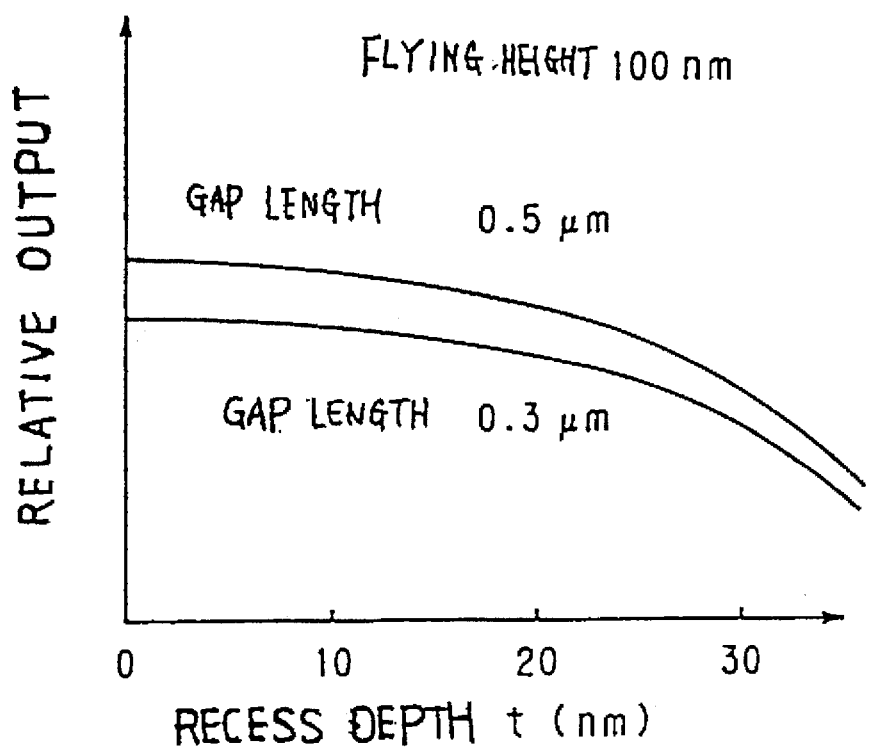
FIG. 3 is a graph showing a relative output of the magnetic head in relation to a recess depth of a magnetic metal film in accordance with the first embodiment.

As can be understood from FIG. 3, in each case, the relative output shows a tendency that it steeply decreases after the depth t exceeds 20 nm. Accordingly, it is preferable for the depth t of recessed portion 15 to be designed not to exceed 20 nm. Furthermore, by taking account of the fact that the thickness of the lubricant coated on the surface of the magnetic disk is approximately 2 nm, it is concluded that the depth t of the recessed portion 15 is preferable if it is set within a range from 2 nm to 20 nm. Especially, a superior result is expected when the recess depth t is set within a narrower range from 5 nm to 15 nm.

Next, one method for fabricating the recessed portion 15 on the magnetic metal film 13 is explained hereinafter.

After the magnetic head is completed, this magnetic head is immersed 5 to 10 minutes in alkali etchant that can etch the magnetic metal film 13. Subsequently, the etchant is sufficiently washed away by flowing water. Thus, only the magnetic metal film 13 is etched in such a manner that the recessed portion 15 is provided at the same side as the medium confronting surface 14. The pH of the etchant is desirable in this case to be 11~13.

As is described in the foregoing description, the recessed portion 15 is provided on the magnetic metal film 13 secured on the gap confronting surface 5a of the core 5 by forming hollow from the medium confronting surface 14. Therefore, the magnetic metal film 13 is prevented from directly contacting with the lubricant coated on the surface of the magnetic disk or the moisture settled on the surface of the magnetic disk. Thus, color change or the like is not caused on the magnetic metal film 13 and therefore various characteristics of the magnetic head are maintained properly without being deteriorated.

SECOND EMBODIMENT

Figure 4:
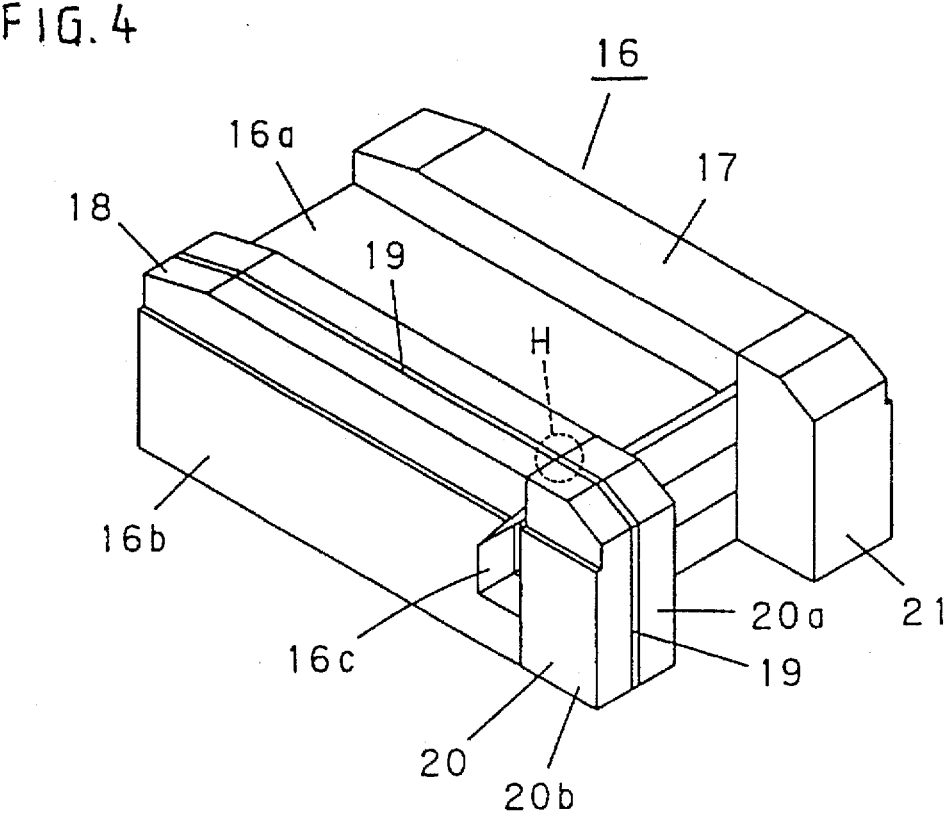
FIG. 4 is a perspective view showing a magnetic head apparatus in accordance with a second embodiment of the present invention.

A magnetic head apparatus in accordance with a second embodiment of the present invention is perspectively shown in FIG. 4. As shown in FIG. 4, a slider portion 18 has a pair of floating rails 17, 18 elongated in parallel with each other at opposite both ends of the slider portion 18. The slider portion 18 consists of substrates 16a, 16b made of a non-magnetic material such as ceramic and a laminated core 19 being sandwiched between these substrates 16a, 16b.

Furthermore, the slider portion 18 is formed with a winding groove 16c on the edge surface thereof. Cores 20 and 21 are provided along both vertical edges of one side surface of the slider portion 16. One core 20, disposed vertically at left-hand side of the slider portion 16 in FIG. 4, is secured on the edge surface of the slider portion 16 to confront to the winding groove 16c formed thereon through a non-magnetic material serving as the magnetic gap, in such a manner that the outer surface of the core 20 exactly coincides with the outer surface of the floating rail 18.

In the same manner, the other core 21, disposed vertically at right-hand side of the slider portion 16 in FIG. 4, is secured on the edge surface of the slider portion 16 to confront to the winding groove 18c formed thereon through a non-magnetic material serving as the magnetic gap, in such a manner that the outer surface of the core 21 exactly coincides with the outer surface of the floating rail 17.

As the magnetic head used in this embodiment is a one-track type, the core 21 is constituted by a non-magnetic material such as a ceramic. On the other hand, the core 20 is constituted by the substrates 20a, 20b made of a non-magnetic material such as ceramic and a laminated core 19 sandwiched therebetween.

Figure 5:
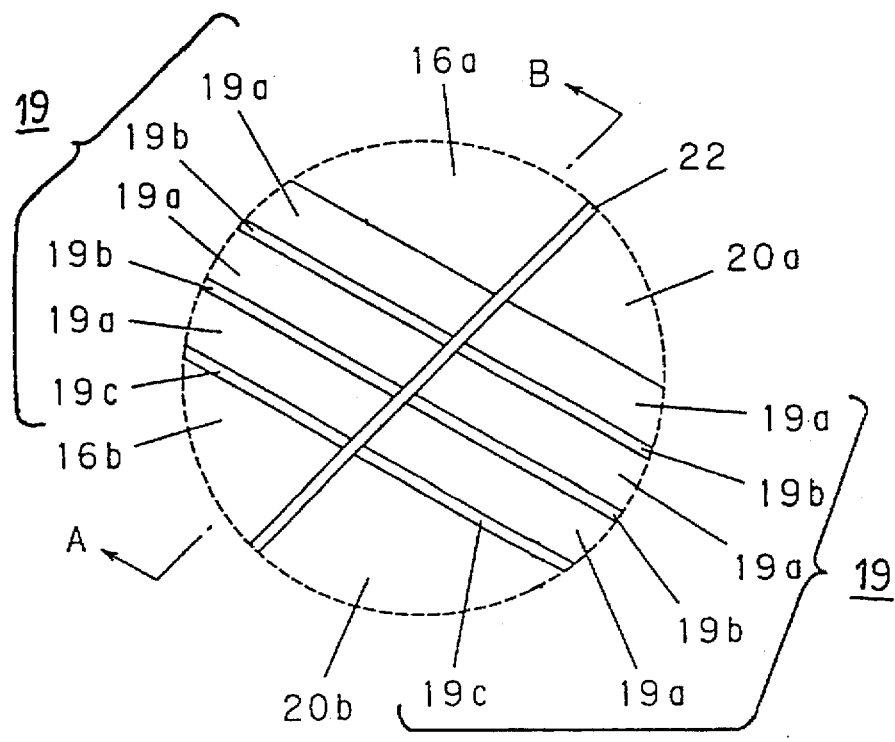
FIG. 5 is a fragmentally enlarged view showing the magnetic head apparatus in accordance with the second embodiment of the present invention.

An area circled by a dashed line and designated by a reference symbol H in FIG. 4 is enlargedly shown in FIG. 5. In FIG. 5, a reference numeral 22 denotes the magnetic gap which is located between the slider portion 16 and the core 20. As can be seen in the drawing, the laminated core 19 is constituted by alternately laminating a magnetic metal film 19a and an insulation film 19b. Though the laminated core 19 consists of three layers 19a, 19a, and 19a of the magnetic metal film and two layers 19b, 19b of the insulation film, it is needless to say that the number of these layers can be increased or decreased as occasion demands.

The magnetic metal film 19a is made of a magnetic metal material such as Fe—Ni series alloy, Fe—Al—Si series alloy, Fe series amorphous, or Co series amorphous and the like. And, the insulation film 19b is made of an insulation material such as $SiO_2$. Thus constituted laminated core 19 is fabricated in the following manner.

First of all, the magnetic metal film 19a is grown on the substrate 16a through an application of the thin film fabrication technology represented by sputtering or deposition. And then, the insulation film 19b is grown on this magnetic metal film 19a in the same way. Further, by repeating this fabricating cycle, an alternately laminated structure of the magnetic metal film 19a and the insulation film 19b can be constructed on the substrate 16a.

When the width of the laminated core 19 becomes as thick as a predetermined value; i.e. a track width, the outer substrate 16b is bonded on the laminated core 19 by means of adhesive material 19c such as bonding glass.

The laminated core 19 provided in the core 20 is also fabricated in the same fashion.

Figure 6:
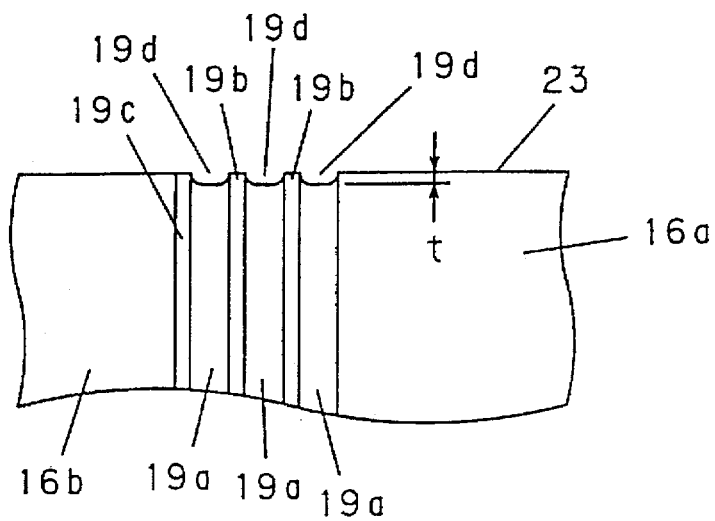
FIG. 6 is a fragmentally enlarged cross-sectional view showing the magnetic head apparatus in accordance with the second embodiment of the present invention.

FIG. 6 is a cross-sectional view taken along a line A–B in FIG. 5. As can be seen from FIG. 8, each magnetic metal film 19a is formed with a recessed portion 19d at the same side as a medium confronting surface 23. And, in this embodiment, the depth t of the recessed portion 19d is set to 10 nm from the medium confronting surface 23.

By providing the recessed portion 19d on the magnetic metal film 19a in this manner, the magnetic metal film 19a is surely prevented from being brought into contact with the magnetic disk when the magnetic disk is in a stationary condition without being turned. Accordingly, the magnetic metal film 19a cannot cause chemical reaction with the lubricant coated on the magnetic disk or moisture settled on the surface of the magnetic disk irrespective of the chemically active nature of the magnetic metal film 19a. Thus, no color change is generated on the magnetic metal surface 19a and therefore no deterioration in various characteristics of the magnetic head will be expected.

Next, a relationship between the depth t of the recess portion 19d and a relative output of the magnetic head is explained. In this second embodiment, the measurement of the relationship between the depth t of the recess portion 19d and the relative output of the magnetic head is carried out in two cases of lengths 0.5 μm and 0.3 μm with respect to the magnetic gap 22. Furthermore, a flying height of the magnetic head is set to 100 nm. And, the size of the magnetic disk is 3.5 inches. Co—Ni—Cr is used as a material for the magnetic film. The result of this measurement is shown in FIG. 7.

Figure 7:
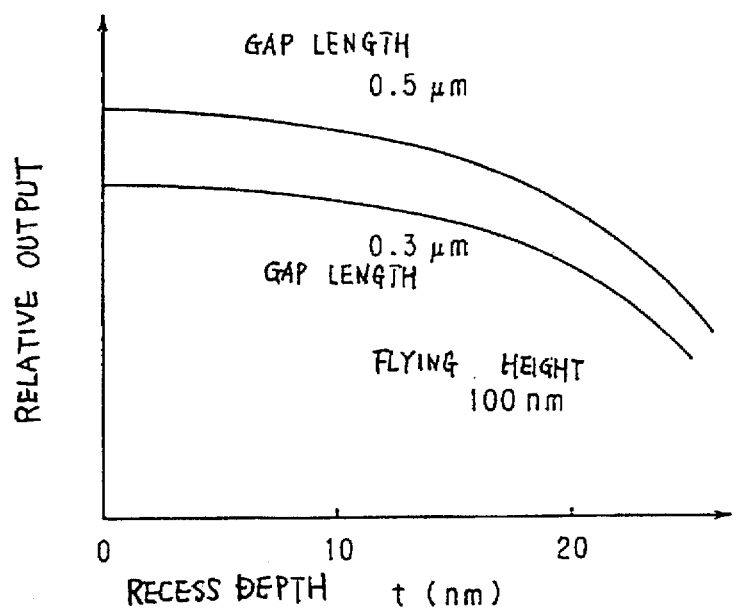
FIG. 7 is a graph showing a relative output of the magnetic head in relation to a recess depth of a magnetic metal film in accordance with the second embodiment.

As can be understood from FIG. 7, in each case, the relative output shows a tendency that it steeply decreases after the depth t exceeds 20 nm. Accordingly, it is preferable for the depth t of the recessed portion 19d to be designed not to exceed 20 nm. Furthermore, by taking account of the fact that the thickness of the lubricant being coated on the surface of the magnetic disk is approximately 2 nm, it is concluded that the depth t of the recessed portion 19d is preferable to be set within a range from 2 nm to 20 nm. Furthermore, a superior result is expected if the recess depth t is set within a narrower range from 5 nm to 15 nm.

Next, one method for fabricating the recessed portion 19d on the magnetic metal film 19a is explained hereinafter.

After the manufacturing of the magnetic head is completed, the magnetic head is immersed 5 to 10 minutes in alkali etchant that is effective to etch the magnetic metal film 19a and noneffective against the substrate. Subsequently, the etchant is sufficiently washed away by flowing water. Thus, the magnetic metal film 19a is only etched in such a manner that the recessed portion 19d is provided on the magnetic metal film 19a at the same side as the medium confronting surface 23. The pH of the etchant is desirable in this case to be 11~13.

Figure 8:
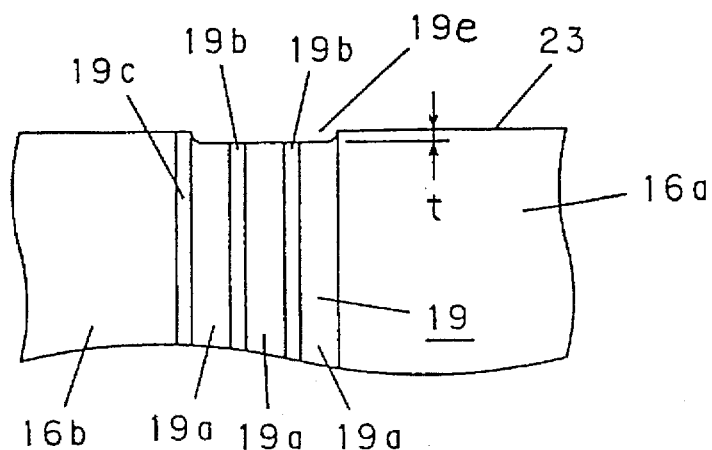
FIG. 8 is a fragmentally enlarged cross-sectional view showing a modified magnetic head apparatus in accordance with the second embodiment of the present invention.

FIG. 8 shows a modified embodiment of the second embodiment. In FIG. 8, almost all the components such as substrates 16a, 16b, laminated core 19, magnetic metal films 19a, insulation films 19b, and adhesive material 19c have substantially the same structures as those shown in FIG. In this embodiment, a recessed portion 19e has a depth t from the medium confronting surface 23. However, this recessed portion 19e is different from the recessed portion 19d of FIG. 6 in that it is formed widely to range from edge to edge of the laminated core 19. Even if the recessed portion is fabricated in this manner, substantially the same effect as the second embodiment can be obtained. It is preferable to design the depth t to be within a range from 2 nm to 20 nm, too.

THIRD EMBODIMENT

Figure 9:
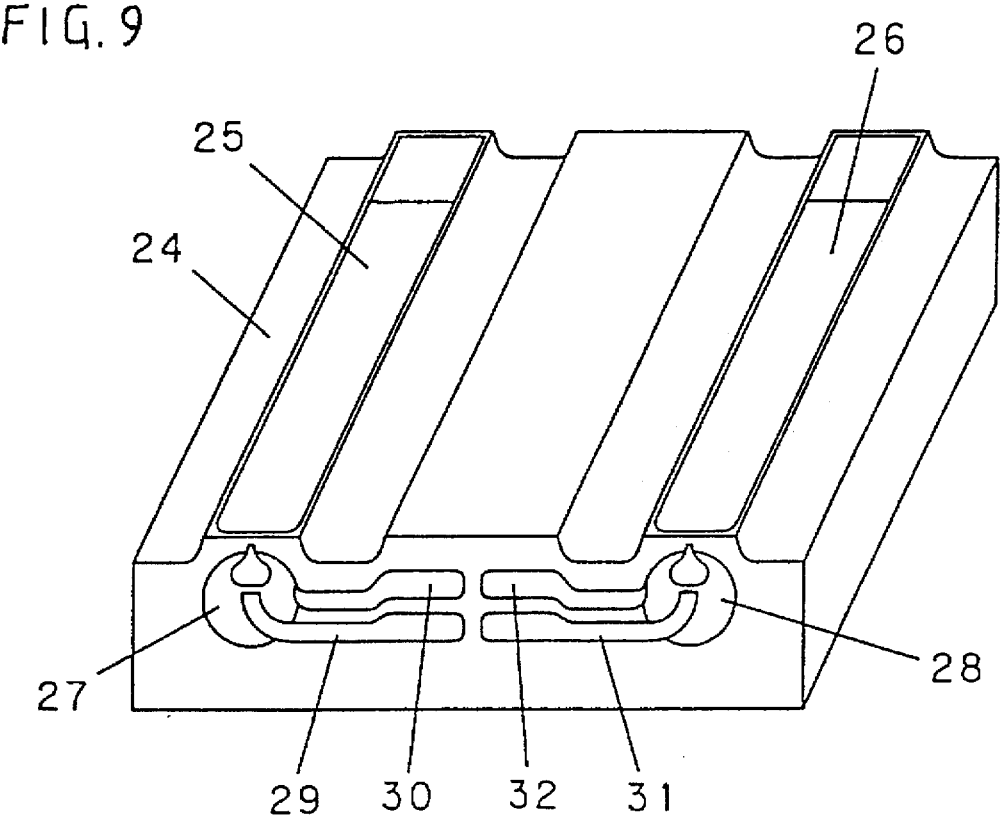
FIG. 9 is a perspective view showing a magnetic head apparatus in accordance with a third embodiment of the present invention.

A magnetic head apparatus in accordance with a third embodiment of the present invention is perspectively shown in FIG. 9. In FIG. 9, a slider 24 is made of a non-magnetic material such as a ceramic and has a pair of floating rails 25, 28 elongated in parallel with each other at opposite both ends of the slider 24.

These floating rails 25, 28 have end surfaces being attached with thin-film type magnetic heads 27, 28, respectively. The thin-film type magnetic head 27 is provided with two leads 29, 30 for supplying current to coil layer and discharging it from the coil layer. In the same way, the thin-film type magnetic head 28 is provided with two leads 31, 32.

Figure 10:
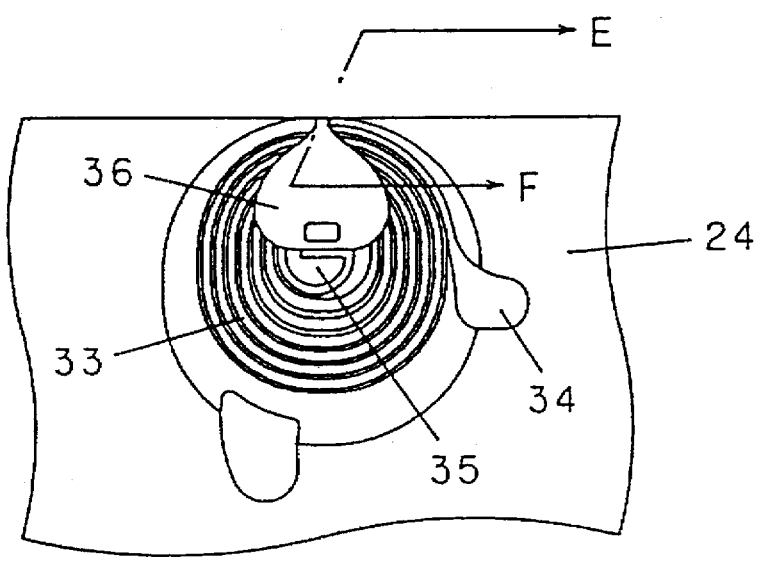
FIG. 10 is a fragmentally enlarged plane view showing the magnetic head apparatus in accordance with the third embodiment of the present invention.

FIG. 10 is an enlarged perspective diagram showing the thin-film type magnetic heat 27. In FIG. 10, a reference numeral 33 denotes the coil layer of spiral-shaped that is constituted by a conductive material such as copper. The coil layer 33 has a pair of edge portions 34, 35. One edge portion 35 is connected to the lead 29, and the other edge portion 34 is connected to the lead 30. There is provided an upper magnetic layer 36 on the coil layer 33. The thin-film type magnetic head is further explained in detail with reference to FIG. 11.

Figure 11:
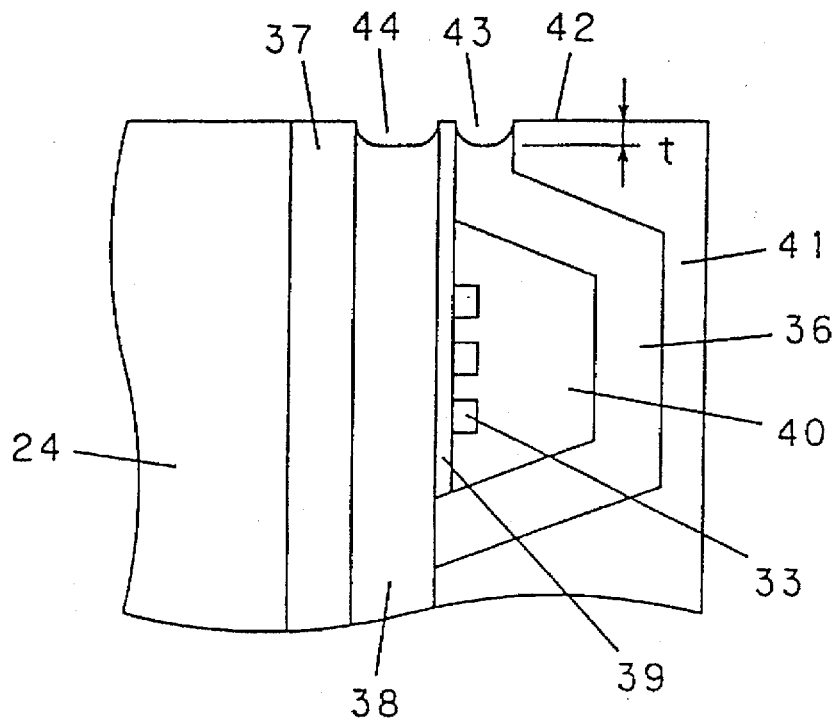
FIG. 11 is a fragmentally enlarged cross-sectional view showing the magnetic head apparatus in accordance with the third embodiment of the present invention.

FIG. 11 is a cross-sectional view taken along a line E–F of FIG. 10. First of all, on the slider 24 that serves as a substrate as well as a slider, there is provided an insulation layer 37 being formed by an insulation material such as $SiO_2$. Then, a lower magnetic layer 38 is constructed on this insulation layer 37 through an application of the thin layer fabricating technology. In turn, on this lower magnetic layer 38, there is formed a gap layer 39 which is made of a non-magnetic material such as $SiO_2$. This gap layer 39 serves as a magnetic gap. Subsequently, a coil layer 33 is formed on this gap layer 39.

The coil layer is provided in such a manner that a conductive film is uniformly formed, first of all, on the gap layer 39 through an application of the thin-film fabrication technology such as a deposition and, thereafter, the conductive film is lifted off in a spiral shape to remain a coil layer 33 on the gap layer 39.

Then, the coil layer 33 is covered by an insulation layer 40 being made of an insulation material such as photoresist. Further, on this insulation layer 40, there is provided the upper magnetic layer 36 so as to constitute a magnetic circuit together with the lower magnetic layer 38. Moreover, a protection layer 41 is formed so as to cover the upper magnetic layer 36 and the coil layer 33 protruding from the upper magnetic layer 36. This protection layer 41 is also formed through an application of the thin-film fabrication technology such as sputtering. And, the material for the protection layer 41 is generally selected from materials having good weatherability such as $SiO_2$.

In thus formed thin-film type magnetic head, the upper magnetic layer 36 and the lower magnetic layer 38 are made of a magnetic metal material. For example, Fe—Ni series alloy, Fe—Al—Si series alloy, Fe series amorphous, and Co series amorphous can be used as a material for the upper magnetic layer 36. The lower magnetic layer 38 can be constituted by the same material as the upper magnetic layer 36.

As to the characteristic feature of the present invention, recessed portions 43, 44 are formed on the upper and lower magnetic layer 38, 38, respectively. Both the recessed portions 43, 44 are provided at the same side as a medium confronting surface 42 and have a depth t from the medium confronting surface 42. In this embodiment, this depth t is set to 10 nm.

By providing the recessed portions 43, 44 on the upper and lower magnetic layers 38, 38 in this manner, the upper and lower magnetic layers 38, 38 are surely prevented from being brought into contact with the magnetic disk when the magnetic disk is in a stationary condition without being turned. Accordingly, the upper and lower magnetic layers 38, 38 cannot cause chemical reaction with the lubricant coated on the magnetic disk or moisture settled on the surface of the magnetic disk irrespective of the chemically active nature of magnetic metal material constituting the upper and lower magnetic layers 38, 38. Thus, no color change is generated on the upper and lower magnetic layers 38, 38 and therefore no deterioration in various characteristics of the magnetic head will be expected.

Next, a relationship between the depth t of the recessed portions 43, 44 and a relative output of the magnetic head is explained. In this third embodiment, the measurement of the relationship between the depth t of the recessed portions 43, 44 and the relative output of the magnetic head is carried out in two cases of lengths 0.5 μm and 0.3 μm with respect to the gap layer 39. Furthermore, a flying height of the magnetic head is set to 100 nm. And, the size of the magnetic disk is 3.5 inches. Co—Ni—Cr is used as a material for the magnetic film. The result of this measurement is shown in FIG. 12.

Figure 12:
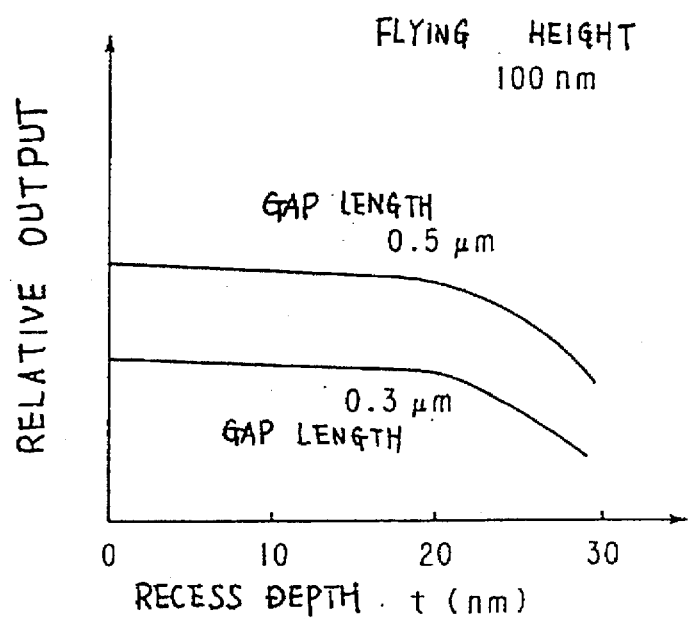
FIG. 12 is a graph showing a relative output of the magnetic head in relation to a recess depth of an upper magnetic layer and a lower magnetic layer.

As can be understood from FIG. 12, in each case, the relative output shows a tendency that it steeply decreases after the depth t exceeds 20 nm. Accordingly, it is preferable for the depth t of the recessed portions 43, 44 to be designed not to exceed 20 nm. Furthermore, by taking account of the fact that the thickness of the lubricant being coated on the surface of the magnetic disk is approximately 2 nm, it is concluded that the depth t of the recessed portions 43, 44 is preferable if it is set within a range from 2 nm to 20 nm. Furthermore, a superior result is expected when the recessed depth t is set within a narrower range from 5 nm to 15 nm.

Next, one method for fabricating the recessed portions 43, 44 on the upper and lower magnetic layers 36, 38 explained hereinafter.

After the manufacturing of the magnetic head is completed, the magnetic head is immersed 5 to 10 minutes alkali etchant that is effective to etch the upper and lower magnetic layers 36, 38 and noneffective against the substrate. Subsequently, the etchant is sufficiently washed away by flowing water. Thus, the upper and lower magnetic layers 36, 38 are only etched in such a manner that the recessed portions 43, 44 are formed on the upper and lower magnetic layers 36, 38 at the same side as the medium confronting surface 42. The pH of the etchant is desirable in this case to be 11~13.

FOURTH EMBODIMENT

Figure 13:
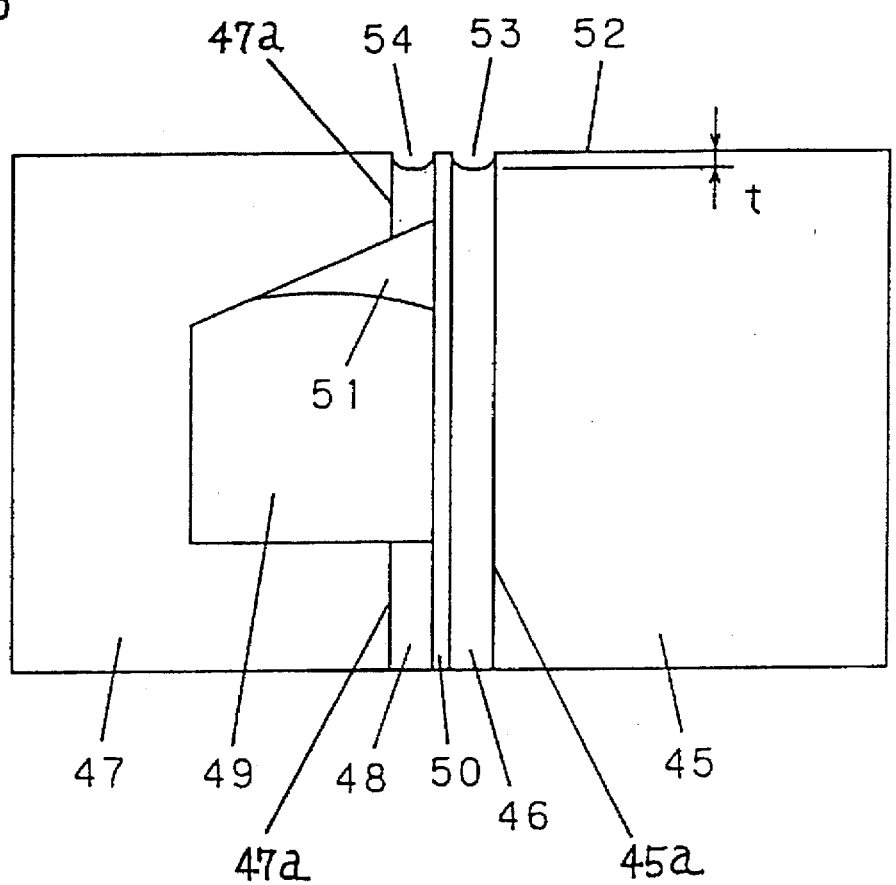
FIG. 13 is a side view showing a magnetic head apparatus in accordance with a fourth embodiment of the present invention.

A magnetic head apparatus in accordance with a fourth embodiment of the present invention is shown in FIG. 13. In FIG. 13, a reference numeral 45 denotes an I-shaped core made of a magnetic oxide material such as ferrite. The core 45 has one side surface 45a being confronted to a magnetic gap 50. A magnetic metal film 48 is formed on this gap confronting surface 45a. The magnetic metal film 48 is made of a magnetic metal material. For example, Fe—Ni series alloy, Fe—Al—Si series alloy, Fe series amorphous, and Co series amorphous can be used as a material for the magnetic metal film 46.

Furthermore, the magnetic metal film 46 is constructed through the thin-film fabrication technology such as sputtering or metal plating and the like.

A reference numeral 47 denotes a C-shaped core that is made of a magnetic oxide material such as ferrite. The core 47 has side surfaces 47a being confronted to the magnetic gap 50. Magnetic metal films 48 are formed on these gap confronting surfaces 47a. This magnetic metal film 48 is made of the same material as the magnetic metal film 46 through the same fabrication method as the magnetic metal film 46.

Furthermore, the winding groove 49 is formed in the core 47 to open toward the magnetic gap 50. Cores 45 and 47 are connected by means of bonding glass 51 in such a manner that the magnetic metal film 46 and the magnetic metal film 48 confront each other to sandwich the magnetic gap 50 made of a non-magnetic film material therebetween.

Moreover, as to the characteristic feature of the invention, recessed portions 53, 54 are provided on the magnetic metal films 46, 48, respectively. Both the recessed portions 53, 54 are formed at the same side as a medium confronting surface 52 and have a depth t from the medium confronting surface 52. In this embodiment, this depth t is set to 10 nm.

By providing the recessed portions 53, 54 on the magnetic metal films 46, 48 in this manner, the magnetic metal films 46, 48 are surely prevented from being brought into contact with the magnetic disk when the magnetic disk is in a stationary condition without being turned. Accordingly, the magnetic metal films 46, 48 cannot cause chemical reaction with the lubricant coated on the magnetic disk or moisture settled on the surface of the magnetic disk irrespective of the chemically active nature of magnetic metal material constituting the magnetic metal films 46, 48.

A relationship between the depth t of the recessed portions 53, 54 and its relative output of the magnetic head is substantially the same as that shown in FIG. 3. Namely, the relative output shows a tendency that it steeply decreases after the depth t exceeds 20 nm. Accordingly, it is preferable for the depth t of the recessed portions 53, 54 to be designed not to exceed 20 nm. Furthermore, by taking account of the fact that the thickness of the lubricant being coated on the surface of the magnetic disk is approximately 2 nm, it is concluded that the depth t of the recessed portions 53, 54 is preferable if it is set within a range from 2 nm to 20 nm. Furthermore, a superior result is expected when the recessed depth t is set within a narrower range from 5 nm to 15 nm.

Next, one method for fabricating the recessed portions 53, 54 on the magnetic metal films 46, 48 is explained hereinafter.

After the manufacturing of the magnetic head is completed, the magnetic head is immersed 5 to 10 minutes in alkali etchant that is effective to etch the magnetic metal films 46, 48 and noneffective against the substrate. Subsequently, the etchant is sufficiently washed away by flowing water. Thus, the magnetic metal films 46, 48 are only etched in such a manner that the recessed portions 53, 54 are formed on the magnetic metal films 46, 48 at the same side as the medium confronting surface 52. The pH of the etchant is desirable in this case to be 11˜13.

As is described in the foregoing description, the recessed portion is provided only on the component made of a magnetic metal material by forming hollow from the medium confronting surface. Therefore, the magnetic metal component is surely prevented from being brought into contact with the lubricant directly coated on the surface of the magnetic disk or the moisture settled on the surface of the magnetic disk. Thus, color change or the like is not caused on the magnetic metal component and therefore various characteristics of the magnetic head are maintained properly without being deteriorated.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A magnetic head apparatus comprising:

first and second cores made of a magnetic oxide material and constituting part of a magnetic head;

a winding groove provided on at least one of said first and second cores;

a magnetic gap provided between said first and second cores;

a first magnetic metal film interposed between said first core and said magnetic gap;

a second magnetic metal film interposed between said second core and said magnetic gap;

a medium confronting surface on one side of said magnetic head which is brought into slidable contact with a surface of a medium;

said first and second magnetic metal film having a surface confronting the surface of the medium; and said surface of each said first and second magnetic films being recessed from said medium confronting surface, to form a recessed portion wherein a clearance between the surface of said medium at the center of said recessed portion is larger than a clearance at the edge of said recessed portion and wholly spaced from said medium confronting surface while said magnetic gap is brought into contact with said medium confronting surface.

2. A magnetic head apparatus in accordance with claim 1 in which a depth of said recessed surface of the magnetic metal film is smaller than a predetermined value corresponding to a point where a steep attenuation occurs in a relative output of the magnetic head in relation to the depth of said recessed surface.

3. A magnetic head apparatus in accordance with claim 2 in which the depth of said recessed surface of the magnetic metal material is larger than a value equivalent to a thickness of lubricant coated on the surface of said medium.

4. A magnetic head apparatus in accordance with claim 1 in which said recessed surface of the magnetic metal film is retracted from the medium confronting surface by 2 nm to 20 nm.

5. A magnetic head apparatus in accordance with claim 1 in which said recessed surface of the magnetic metal material is retracted from the medium confronting surface by 5 nm to 15 nm.

6. A magnetic head apparatus in accordance with claim 1 in which said recessed surface of the magnetic metal film is fabricated in such a manner, after a manufacturing of the magnetic head is completed, this magnetic head is immersed 5 to 10 minutes in alkali etchant so that only the magnetic metal film is etched, and subsequently, the etchant is sufficiently washed away by flowing water, whereby producing the recessed surface at the same side as the medium confronting surface.

7. A magnetic head apparatus in accordance with claim 6 in which said etchant has a pH of 11˜13.

8. A magnetic head apparatus in accordance with claim 1 in which said core is made of ferrite and said magnetic metal film is made of at least one material belonging to a group consisting of Fe—Ni series alloy, Fe—Al—Si series alloy, Fe series amorphous, and Co series amorphous.

\* \* \* \* \*